US009510226B2

(12) United States Patent
Guan et al.

(10) Patent No.: US 9,510,226 B2
(45) Date of Patent: Nov. 29, 2016

(54) INFORMATION ACQUIRING METHOD AND BASE STATION

(71) Applicant: FUJITSU LIMITED, Kawasaki-shi, Kanagawa (JP)

(72) Inventors: Na Guan, Beijing (CN); Lin Tian, Beijing (CN); Yi Huang, Beijing (CN); Weiwei Wang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 14/057,579

(22) Filed: Oct. 18, 2013

(65) Prior Publication Data

US 2014/0078923 A1  Mar. 20, 2014

Related U.S. Application Data

(63) Continuation of application No. PCT/CN2011/072988, filed on Apr. 19, 2011.

(51) Int. Cl.
*H04W 24/00* (2009.01)
*H04W 24/10* (2009.01)
*H04W 4/06* (2009.01)
*H04W 36/00* (2009.01)

(52) U.S. Cl.
CPC .......... *H04W 24/10* (2013.01); *H04W 4/06* (2013.01); *H04W 36/0022* (2013.01)

(58) Field of Classification Search
None
See application file for complete search history.

(56) References Cited

U.S. PATENT DOCUMENTS

| 7,876,729 | B1 | 1/2011 | Grilli et al. | |
| 2006/0107287 | A1* | 5/2006 | Lee et al. | 725/32 |
| 2008/0267109 | A1* | 10/2008 | Wang et al. | 370/312 |
| 2008/0273482 | A1 | 11/2008 | Lee et al. | |

(Continued)

FOREIGN PATENT DOCUMENTS

| CN | 101242573 | | 8/2008 |
| CN | 101242573 | A | 8/2008 |

(Continued)

OTHER PUBLICATIONS

Tsuboi et al, European Patent Application No. 2291035, Tsuboi et al, Mar. 2, 2011.*

(Continued)

*Primary Examiner* — Hassan Phillips
*Assistant Examiner* — Gautam Sharma
(74) *Attorney, Agent, or Firm* — Myers Wolin, LLC

(57) ABSTRACT

An information acquiring method and a base station. The method comprises: receiving by a target base station reception status information of a multimedia broadcast multicast service of user equipment reported by a source base station when the user equipment is handed over between cells; wherein the reception status information comprises information indicating that the user equipment is receiving a multimedia broadcast multicast service, or information indicating that the user equipment finishes receiving a multimedia broadcast multicast service. With the embodiments of the present invention, the source base station of the user equipment notifies the target base station of reception status information of multimedia broadcast multicast service of the user equipment when the user equipment is handed over between cells, thereby guaranteeing the continuity of the MBMS of the user equipment.

25 Claims, 4 Drawing Sheets

(56) References Cited

U.S. PATENT DOCUMENTS

| | | |
|---|---|---|
| 2008/0273503 A1 | 11/2008 | Lee et al. |
| 2010/0113030 A1 | 5/2010 | Kanazawa et al. |
| 2011/0039551 A1 | 2/2011 | Tsuboi et al. |
| 2013/0070660 A1 | 3/2013 | Xu |

FOREIGN PATENT DOCUMENTS

| | | |
|---|---|---|
| CN | 101521850 A | 9/2009 |
| CN | 101547409 | 9/2009 |
| CN | 101883327 A | 10/2010 |
| CN | 101883327 | 11/2010 |
| EP | 1309213 A1 | 5/2003 |
| EP | 2161862 A1 | 3/2010 |
| EP | 2 200 367 A1 | 6/2010 |
| JP | 2008-527904 A | 7/2008 |
| JP | 2009-225291 A | 10/2009 |
| KR | 10-2010-0071796 A | 6/2010 |
| RU | 2 292 665 C2 | 2/2004 |
| WO | 20061080818 A1 | 8/2006 |
| WO | 2008098508 | 8/2008 |
| WO | 2008/129812 A1 | 10/2008 |
| WO | 2009/133767 A1 | 11/2011 |

OTHER PUBLICATIONS

Notice of Reason for Refusal issued for corresponding Japanese Patent Application No. 2014-505479, mailed on Dec. 2, 2014, with an English translation.

Substantive examination report issued for corresponding Mexican Patent Application No. MX/a/2013/012304 dated Jan. 23, 2015, with an English translation.

International Search Report issued for corresponding International Patent Application No. PCT/CN2011/072988, mailed Feb. 2, 2012. English translation attached.

The Extended European Search Report issued for corresponding International Patent Application No. 11863814.7, mailed Sep. 25, 2014.

LG Electronics Inc., "Handover for MBMS service continuity", Agenda Item 7.3.3, 3GPP TSG-RAN WG2 #74, R2-113338, Barcelona, Spain, May 9-13, 2011.

Notice of Reason for Rejection issued for corresponding Japanese Patent Application No. 2014-505479, mailed on Mar. 31, 2015, with an English translation.

Notice of Preliminary Rejection issued for corresponding Korean Patent Application No. 10-2013-7030236 mailed on Apr. 21, 2015 with an English translation.

Office Action issued by the Canadian Intellectual Property Office for corresponding Canadian Patent Application No. 2,833,787, dated Apr. 16, 2015.

Official Action issued by Rospatent Federal Service for Intellectual Property for corresponding Russian Patent Application No. 2013151263/08(079916), mailed Jul. 10, 2015, with an English translation.

Notice of Preliminary Rejection issued by the Korean Intellectual Property Office for corresponding Korean Patent Application No. 10-2013-7030236, mailed on Oct. 20, 2015, with English translation.

First Notification of Office Action issued by the State Intellectual Property Office of China for corresponding Chinese Patent Application No. 201180070160.8, dated Feb. 1, 2016, with an English translation.

Second Notification of Office Action issued by the State Intellectual Property Office of China for corresponding Chinese Patent Application No. 201180070160.8, dated Sep. 29, 2016, with an English translation.

\* cited by examiner

INFORMATION ACQUIRING METHOD AND BASE STATION

CROSS REFERENCE TO RELATED APPLICATIONS

This application is a continuation of International Application PCT/CN2011/072988, filed on Apr. 19, 2011 and designating the U.S., the entire contents of which are incorporated herein by reference.

TECHNICAL FIELD

The present invention relates to the field of wireless communications and, in particular to an information acquiring method, for acquiring reception status information of a multimedia broadcast multicast service of user equipment, and a base station.

BACKGROUND ART

Currently, in order to better satisfy the demands of mobile users in experiencing multimedia broadcast multicast services (MBMSs), and to more efficiently use limited spectral resources, the 3rd generation partnership project (3GPP) supports transmission of MBMSs in long-term evolution (LTE) R9 by using a multicast broadcast single frequency network (MBSFN). Transmission of MBMSs by using an MBSFN needs multiple base stations participating in the transmission to use completely identical time-frequency resources to transmit identical data at the same time. In comparison with a transmission mode of single-cell MBMS, the transmission mode of the MBSFN is able to more efficiently avoid inter-cell interference and bring extra diversity gains. Therefore, it can greatly improve the service reception capabilities of reception users.

However, in the implementation of the present invention, the inventors found that following defects exist in the prior art: in the existing LTE MBMS standards, for the ease of realization and convenient deployment, user equipment receiving a MBMS does not report its MBMS reception status to the base station where it is located. When the user equipment receiving the MBMS is moved out of a corresponding MBSFN area, as a target base station cannot acquire MBMS reception status information of the user equipment, the target base station cannot offer corresponding MBMS service to the user equipment, possibly resulting in interruption of the MBMS of the user equipment, and the continuity of the MBMS of the user equipment being not able to be guaranteed.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

An object of the embodiments of the present invention is to provide an information acquiring method and a base station. When user equipment is handed over between cells, a source base station of the user equipment notifies a target base station of MBMS reception status information of the user equipment, thereby guaranteeing the continuity of the MBMS of the user equipment.

According to an aspect of the embodiments of the present invention, there is provided an information acquiring method, comprising:
receiving by a target base station reception status information of a multimedia broadcast multicast service of user equipment reported by a source base station when the user equipment is handed over between cells;
wherein the reception status information comprises information indicating that the user equipment is receiving a multimedia broadcast multicast service, or information indicating that the user equipment finishes receiving a multimedia broadcast multicast service.

According to another aspect of the embodiments of the present invention, there is provided an information acquiring method, comprising:
reporting by a source base station of user equipment to a target base station reception status information of a multimedia broadcast multicast service of the user equipment when the user equipment is handed over between cells;
wherein the reception status information comprises information indicating that the user equipment is receiving a multimedia broadcast multicast service, or information indicating that the user equipment finishes receiving a multimedia broadcast multicast service.

According to a further aspect of the embodiments of the present invention, there is provided a target base station, comprising:
a first information acquiring unit configured to receive reception status information of a multimedia broadcast multicast service of user equipment reported by a source base station when the user equipment is handed over between cells;
wherein the reception status information comprises information indicating that the user equipment is receiving a multimedia broadcast multicast service, or information indicating that the user equipment finishes receiving a multimedia broadcast multicast service.

According to still another aspect of the embodiments of the present invention, there is provided a source base station, comprising:
an information transmitting unit configured to report to a target base station reception status information of a multimedia broadcast multicast service of user equipment when the user equipment is handed over between cells;
wherein the reception status information comprises information indicating that the user equipment is receiving a multimedia broadcast multicast service, or information indicating that the user equipment finishes receiving a multimedia broadcast multicast service.

According to still another aspect of the embodiments of the present invention, there is provided a computer-readable program, wherein when the program is executed in a target base station, the program enables a computer to carry out the information acquiring method as described above in the target base station.

According to still another aspect of the embodiments of the present invention, there is provided a storage medium in which a computer-readable program is stored, wherein the computer-readable program enables a computer to carry out the information acquiring method as described above in a target base station.

According to still another aspect of the embodiments of the present invention, there is provided a computer-readable program, wherein when the program is executed in a source base station, the program enables a computer to carry out the information acquiring method as described above in the source base station.

According to still another aspect of the embodiments of the present invention, there is provided a storage medium in which a computer-readable program is stored, wherein the computer-readable program enables a computer to carry out the information acquiring method as described above in a source base station.

The advantage of the embodiments of the present invention exists in: the source service base station of the user equipment notifies the target base station of reception status information of a multimedia broadcast multicast service of the user equipment when the user equipment is handed over between cells, thereby guaranteeing the continuity of the MBMS of the user equipment.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The above and other objects, features and advantages of the present invention will be apparent from the following detailed description in conjunction with the drawings, in which.

DETAILED DESCRIPTION OF THE INVENTION

The foregoing and other features of the embodiments of the present invention will become apparent with reference to the drawings and the following description. These embodiments are illustrative only and are not intended to limit the present invention. For easy understanding of the principle and embodiments of the present invention by those skilled in the art, the principle of the embodiments of the present invention shall be described taking MBMS of an LTE/LTE-A system as an example. However, it should be understood that the present invention is not limited to such a system, and it is applicable to other systems related to report of MBMS reception status information.

Figure 1:
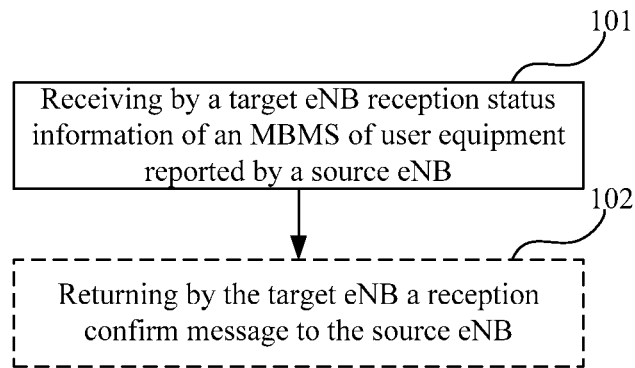
FIG. 1 is a flowchart of the information acquiring method of embodiment 1 of the present invention.

FIG. 1 is a flowchart of the information acquiring method of embodiment 1 of the present invention. As shown in FIG. 1, the method comprises:

step 101: receiving by a target base station (target eNB) reception status information of a multimedia broadcast multicast service (MBMS) of user equipment reported by a source base station (source eNB) when the user equipment is handed over between cells;

wherein the reception status information comprises information indicating that the user equipment is receiving a MBMS information, or information indicating that the user equipment finishes receiving a MBMS information.

In this way, the target eNB obtains MBMS reception status of the user equipment through the information reported by the source eNB, thereby guaranteeing the continuity of the MBMS of the user equipment.

In this embodiment, the source eNB reports the reception status information to the target eNB by using a UE-MBMS reception report message; however, it is not limited to the above message, and any other message may be used to report the reception status information. For example, the reception status information may be reported via an MBMS on message indicating that the UE-MBMS is being received, or the reception status information may be reported via an MBMS off message indicating that the reception of the UE-MBMS is finished.

In this embodiment, when the source eNB reports information containing indication on that the user equipment is receiving the MBMS or finishes reception of the MBMS to the target eNB, MBMS information may also be reported, the service information comprising one or more pieces of following information:

MBSFN area identity, MBMS identity, MBMS session identity, temporary mobile group identity (TMGI) and a carrier frequency carrying an MBMS.

In this embodiment, as shown in FIG. 1, the method may optionally further comprise: step 102: returning by the target eNB a reception confirm message to the source eNB; wherein, in this embodiment, the target eNB may reply a confirm message to the source eNB via a UE-MBMS reception confirm message; however, it is not limited to the above message, and any other message may be used for replying a confirm message.

It can be seen from the above embodiment that when the user equipment is handed over between the cells, the source service eNB of the user equipment notifies the target eNB of the MBMS reception status information of the user equipment, thereby guaranteeing the continuity of the MBMS of the user equipment. Furthermore, MBSFN area identity, MBMS identity, MBMS session identity, TMGI and a carrier frequency carrying an MBMS, etc., may also be notified.

In this embodiment, after the target eNB receives the reception status information reported by the source eNB, when the target eNB is capable of providing the MBMS to the user equipment, the method further comprises: updating by the target eNB the service information of the MBMS received by the user equipment; that is, the service information may comprise MBSFN area identity, MBMS identity, MBMS session identity, TMGI and a carrier frequency carrying an MBMS.

In this embodiment, when the target eNB is incapable of providing the MBMS to the user equipment, the method further comprises:

providing by the target eNB the MBMS to the user equipment through a broadcast or a unicast mode. Examples are as follows:

first, when a target cell belong to a reserved cell of the MBSFN area, the target eNB provides the MBMS through a broadcast or a unicast mode;

second, when a target cell does not belong to the MBSFN area providing the MBMS, the target cell joins in the MBSFN area providing the MBMS, and the target eNB provides the MBMS through broadcast;

third, when a target cell does not belong to the MBSFN area providing the MBMS, the target eNB may set up a link with the provider of the MBMS, and provide the MBMS to the user equipment through a unicast mode; and fourth, when a target cell has no adequate resources for providing the MBMS, the target eNB may set up a link with the provider of the MBMS, and provide the MBMS to the user equipment through a unicast mode.

It can be seen from the above embodiment that when the user equipment is handed over between the cells, the source eNB of the user equipment notifies the target eNB of the MBMS reception status information of the user equipment; and after receiving the reception status information, the target eNB may provides corresponding MBMS to the user equipment through a broadcast or a unicast mode, thereby guaranteeing the continuity of the MBMS of the user equipment.

Embodiment 2

Figure 2:
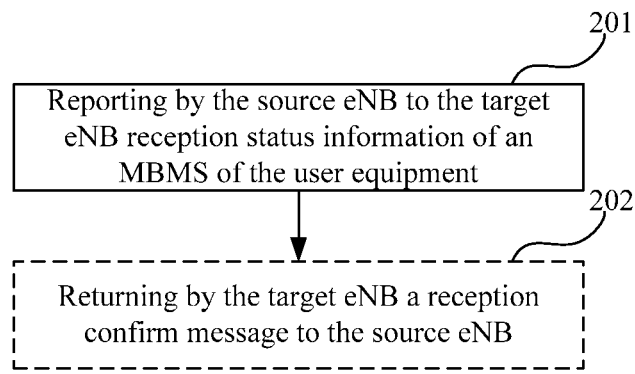
FIG. 2 is a flowchart of the information acquiring method of embodiment 2 of the present invention.

FIG. 2 is a flowchart of the information acquiring method of embodiment 2 of the present invention. As shown in FIG. 2, the method comprises:

reporting by a source eNB of user equipment a target eNB reception status information of a MBMS of the user equipment to when the user equipment is handed over between cells;

wherein the reception status information comprises information indicating that the user equipment is receiving an MBMS (MBMS on), or information indicating that the user equipment finishes receiving an MBMS (MBMS off).

In this embodiment, besides the information containing indication on that the user equipment is receiving the MBMS or finishes reception of the MBMS, the source eNB may also report MBMS service information to the target eNB, the service information being as described in embodiment 1, which shall not be described herein any further.

In this embodiment, the method may optionally further comprise: acquiring by the source eNB a reception confirm message returned by the target eNB, wherein, in this embodiment, the source eNB may report the reception status information to the target eNB by using a UE-MBMS reception report message; however, it is not limited to the above message, and any other message may be used to report the reception status information.

In this embodiment, the method may further comprise: acquiring the reception status information by the source eNB. The method for acquiring the reception status information by the source eNB shall be described below in detail with reference to FIGS. 3 and 4.

Figure 3:
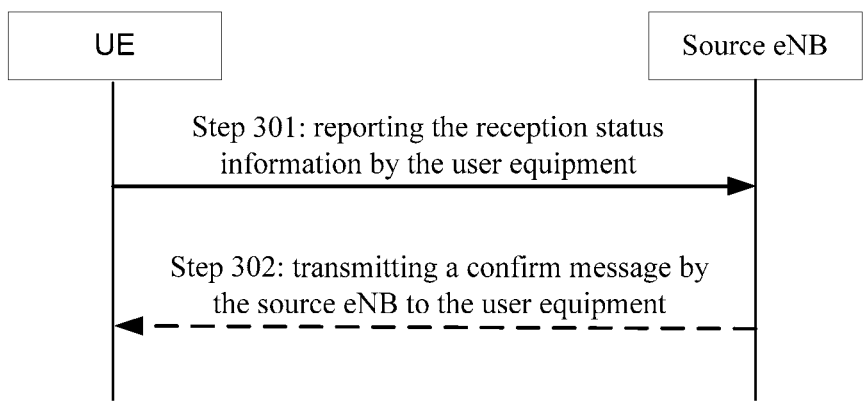
FIG. 3 is a flowchart of the method for acquiring reception status information by the source base station of embodiment 2 of the present invention.

FIG. 3 is a flowchart of the method for acquiring the reception status information by the source eNB of embodiment 2. As shown in FIG. 2, the method comprises:

step 301: reporting the reception status information by the user equipment to the source eNB, so that the source eNB acquires the reception status information;

wherein, when the user equipment is receiving a new MBMS and the user equipment has not fed back any reception status information on the MBMS before to any base station or the source eNB, the user equipment may transmit the reception status information to the source eNB via an MBMS reception status report (MBMS on) message (is receiving); however, it is not limited to such a message, and any other message may be used; wherein, if the user equipment reports the information to the source eNB only when the user equipment has not reported an MBMS reception status to any base station, it may be avoided that the user equipment reports the reception status information in each time of being handed over to a new base station;

after finishing reception of corresponding MBMS, the user equipment transmits an MBMS reception status report (MBMS off) message (reception finished) to the source eNB; however, it is not limited to such a message, and any other message may be used;

furthermore, the above messages may comprise corresponding MBMS service information, such as MBSFN area identity, MBMS identity, MBMS session identity, TMGI, and a carrier frequency carrying an MBMS, etc.;

step 302: transmitting a confirm message by the source eNB to the user equipment after the source eNB receives the reception status information reported by the user equipment;

wherein, step 302 is optional, and an MBMS reception status confirm message may be used as the confirm message; however, it is not limited to such a message, and any other message may be used.

It can be seen from above that the source eNB is enabled to obtain the reception status information of an MBMS of the user equipment through the report process initiated by the user equipment.

Figure 4:
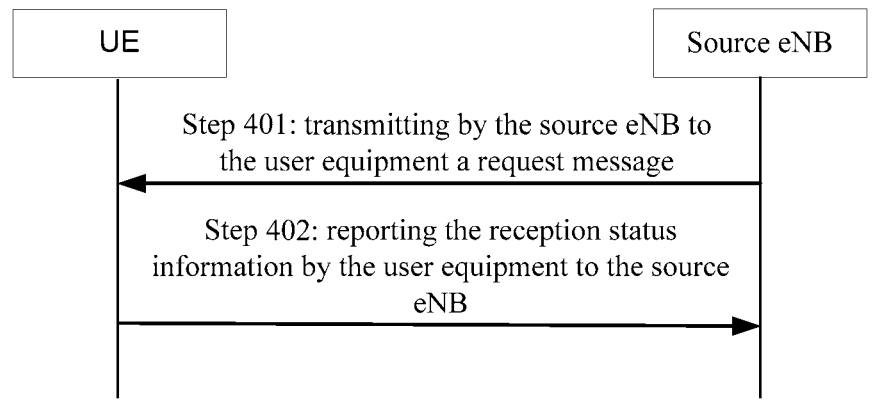
FIG. 4 is a flowchart of the method for acquiring reception status information by the source base station of embodiment 2 of the present invention.

FIG. 4 is a flowchart of the method for acquiring reception status information by the source base station of embodiment 2. As shown in FIG. 4, the method comprises:

step 401: transmitting by the source eNB to the user equipment a request message instructing the user equipment to report the reception status information of an MBMS;

wherein, the source eNB may broadcast an MBMS reception status request message, indicating that the user equipment within its serving area reports the reception status information of the MBMS to the source eNB;

step 402: reporting the reception status information by the user equipment according to the request message after receiving the request message broadcasted by the source eNB, so that the source eNB acquires the reception status information;

wherein, the user equipment may report the reception status information via a response message;

if the user equipment is receiving a corresponding MBMS and the user equipment has not fed back any reception status information on the MBMS before to any base station or the source eNB, the user equipment may indicate its current reception status to the source eNB via an MBMS reception status response (MBMS on) message (is receiving); wherein the time of transmission of the response message may be the time when reception of the broadcast service is started, or the time when the handover is prepared;

furthermore, if the user equipment finishes the reception of corresponding MBMS, the user equipment may inform the source eNB that its corresponding reception of MBMS is finished by transmitting an MBMS reception status response (MBMS off) message (reception is finished), the response message being transmitted at the time of finishing the reception of the service;

the above two messages may further comprise corresponding MBMS service information, such as MBSFN area identity, MBMS session identity, MBMS session identity, TMGI, and a carrier frequency carrying an MBMS, etc.

It can be seen from above that the source eNB is enabled to obtain the reception status information of an MBMS of the user equipment through the report process initiated by the base station at the network side.

It can be seen from the above embodiment that when the user equipment is handed over between the cells, the source service eNB of the user equipment notifies the target eNB of the MBMS reception status information of the user equipment; and after receiving the reception status information, the target eNB may provides corresponding MBMS to the user equipment through a broadcast or a unicast mode, thereby guaranteeing the continuity of the MBMS of the user equipment. Wherein, the source eNB may obtain the reception status information of the user equipment via the report process initiated by the network side or via the report process initiated by the user equipment An embodiment of the present invention further provides a source eNB and a target eNB, as described in embodiment 3 and embodiment 4 below. As the principles of the source eNB and the target eNB for solving problems are similar to those of the above-described information acquiring methods based on a source eNB and a target eNB, the implementation of the methods may be referred to for the implementation of the source eNB and the target eNB, and the repeated parts shall not be described any further.

Embodiment 3

Figure 5:
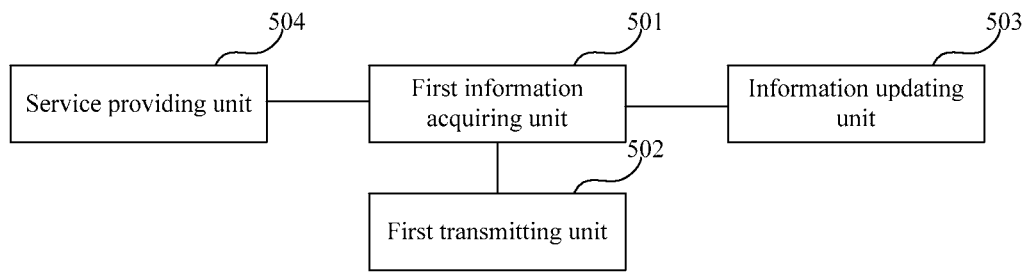
FIG. 5 is a structural schematic diagram of the target base station of embodiment 3 of the present invention.

FIG. 5 is a functional structural schematic diagram of the target eNB of embodiment 3 of the present invention. As shown in FIG. 5, the target eNB comprises a first information acquiring unit 501; wherein the first information acquiring unit 501 is configured to receive reception status information of an MBMS of user equipment reported by a source base station when the user equipment is handed over between cells;

wherein the reception status information comprises information indicating that the user equipment is receiving an MBMS (MBMS on), or information indicating that the user equipment finishes receiving an MBMS (MBMS off).

It can be seen from the above embodiment that when the user equipment is handed over between the cells, the source eNB of the user equipment notifies the target eNB of the MBMS reception status information of the user equipment, thereby guaranteeing the continuity of the MBMS of the user equipment.

In this embodiment, the source eNB may further report the service information to the target eNB. In this way, the first information acquiring unit 501 may further acquire the service information, the service information being as described in embodiment 1, which shall not be described any further.

As shown in FIG. 5, the target eNB may further comprise a first transmitting unit 502 configured to return a reception confirm message to the source eNB after receiving the reception status information.

In the above embodiment, the message used by the source eNB in transmitting the reception status information and the message used in transmitting the reception confirm message are as described in embodiment 1 and embodiment 2, which shall not be described any further.

In this embodiment, as shown in FIG. 5, the target eNB may further comprise an information updating unit 503 configured to update the service information of the MBMS received by the user equipment when the target base station is capable of providing to the user equipment the MBMS. Wherein, the service information is as described in embodiment 1, which shall not be described any further.

As shown in FIG. 5, the target base station further comprises a service providing unit 504 configured to provide to the user equipment the MBMS through a broadcast or a unicast mode after the target base station acquires the reception status information and when the target base station is incapable of providing to the user equipment the MBMS. Wherein, using a broadcast or a unicast mode by the service providing unit 504 to provide MBMS is as described in embodiment 1, which shall not be described any further.

It can be seen from the above embodiment that when the user equipment is handed over between the cells, the source service eNB of the user equipment notifies the target eNB of the MBMS reception status information of the user equipment, thereby guaranteeing the continuity of the MBMS of the user equipment; furthermore, after receiving the MBMS reception status information of the user equipment, the target eNB performs corresponding operations according to whether it is capable of providing to the user equipment the MBMS, so as to provide corresponding MBMS to the user equipment.

Embodiment 4

Figure 6:
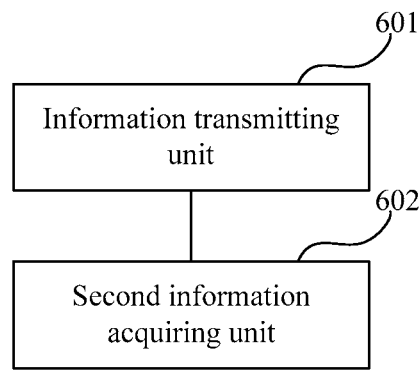
FIG. 6 is a structural schematic diagram of the source base station of embodiment 4 of the present invention.

FIG. 6 is a structural schematic diagram of the source eNB of embodiment 4 of the present invention. As shown in FIG. 6, the source eNB comprises an information transmitting unit 601 configured to report reception status information of an MBMS of user equipment to a target eNB when the user equipment is handed over between cells;

wherein the reception status information comprises information indicating that the user equipment is receiving an MBMS, or information indicating that the user equipment finishes receiving an MBMS.

It can be seen from the above embodiment that when the user equipment is handed over between the cells, the source eNB of the user equipment notifies the target eNB of the MBMS reception status information of the user equipment, thereby guaranteeing the continuity of the MBMS of the user equipment.

In this embodiment, the source eNB may further report MBMS service information in reporting to the target eNB information indicating that the user equipment is receiving or finishes the reception of the MBMS, the service information being as described in embodiment 1, which shall not be described any further.

Before the source eNB reports the reception status information to the target eNB, the source eNB may obtain the reception status information via a report process initiated by the network side or via a report process initiated by the user equipment. Therefore, as shown in FIG. 6, the source eNB may further comprise a second information acquiring unit 602 configured to acquire the reception status information.

Figure 7:
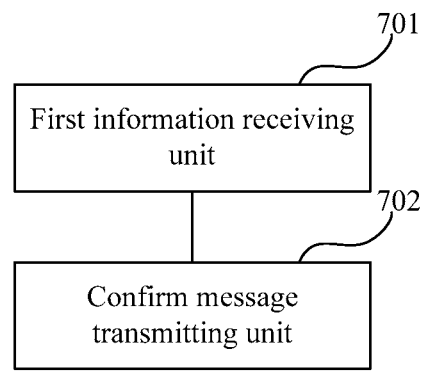
FIG. 7 is a structural schematic diagram of the second information acquiring unit of FIG. 6.

In obtaining the reception status information via a report process initiated by the user equipment, as shown in FIG. 7, the second information acquiring unit 602 may comprise a first information receiving unit 701; wherein, the first information receiving unit 701 is configured to receive the reception status information reported by the user equipment, so as to acquire the reception status information.

In such a case, the source eNB may further comprise a confirm message transmitting unit 702 configured to return a reception confirm message to the user equipment after receiving the reception status information transmitted by the user equipment. Detailed process is as described in embodiment 2, which shall not be described herein any further. Wherein, the confirm message transmitting unit 702 is optional.

Figure 8:
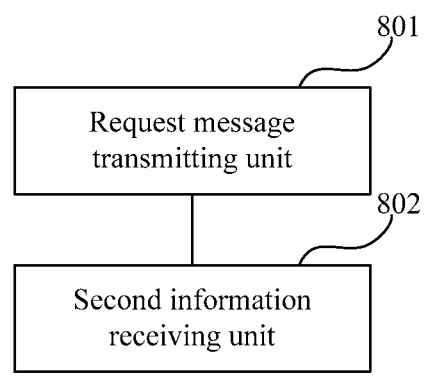
FIG. 8 is a structural schematic diagram of the second information acquiring unit of FIG. 6.

In obtaining the reception status information via a report process initiated by the network side, as shown in FIG. 8, the second information acquiring unit 602 comprises a request message transmitting unit 801 and an information receiving unit 802; wherein, the request message transmitting unit 801 is configured to transmit a request message to the user equipment instructing the user equipment to report the reception status information; and the information receiving unit 802 is configured to receive the reception status information reported by the user equipment according to the request message transmitted by the request message transmitting unit 801, so as to acquire the reception status information.

It can be seen from the above embodiment that when the user equipment is handed over between the cells, the source eNB of the user equipment notifies the target eNB of the MBMS reception status information of the user equipment, thereby guaranteeing the continuity of the MBMS of the user equipment; wherein, the source eNB may obtain the reception status information of the user equipment via a report process initiated by the network side or via a report process initiated by the user equipment.

Figure 9:
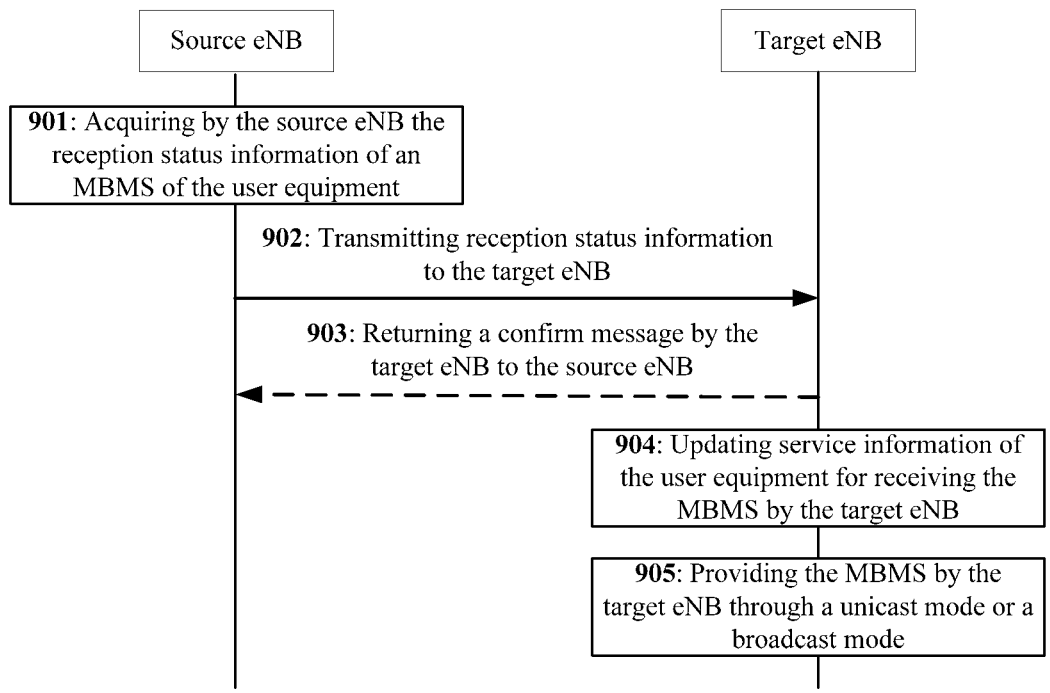
FIG. 9 is a schematic diagram of the interchange of the reception status information of MBMS of the user equipment between a source base station and a target base station of the present invention.

Following description is given to a process of the interchange of the reception status information of MBMS of the user equipment between a source base station and a target base station with reference to FIG. 9.

FIG. 9 is a schematic diagram of the interchange of the reception status information of MBMS of the user equipment between a source base station and a target base station of the present invention. As shown in FIG. 9, following steps are employed:

step 901: acquiring by the source eNB the reception status information of MBMS of the user equipment;

wherein, the information may be acquired by using the methods as described in FIGS. 3 and 4 of embodiment 2, which shall not be described herein any further;

step 902: transmitting reception status information of moving user equipment by the source eNB to the target eNB when the user equipment is handed over between cells;

wherein, the reception status information may be carried by a UE-MBMS reception report message; besides the information indicating that the user equipment is receiving or finishes the reception of the MBMS, the reception status information may further comprise MBMS service information, which are as described in above embodiments, and shall not be described herein any further;

step 903: returning a confirm message by the target eNB to the source eNB after the target eNB receives the reception status information;

wherein, the confirm message may be returned to the source eNB via a UE-MBMS reception confirm message, and this step is optional;

step 904: updating service information of the user equipment for receiving the MBMS by the target eNB after the target eNB receives the report and when the target eNB is capable of providing corresponding MBMS to the user equipment;

step 905: providing the MBMS by the target eNB through a unicast mode or a broadcast mode after the target eNB receives the report and when the target eNB is incapable of providing corresponding MBMS to the user equipment.

An embodiment of the present invention further provides a computer-readable program, wherein when the program is executed in a target eNB, the program enables a computer to carry out the information acquiring method as described in embodiment 1 in the target eNB.

An embodiment of the present invention further provides a storage medium in which a computer-readable program is stored, wherein the computer-readable program enables a computer to carry out the information acquiring method as described in embodiment 1 in a target eNB.

An embodiment of the present invention further provides a computer-readable program, wherein when the program is executed in a source eNB, the program enables a computer to carry out the information acquiring method as described in embodiment 2 in the source eNB.

An embodiment of the present invention further provides a storage medium in which a computer-readable program is stored, wherein the computer-readable program enables a computer to carry out the information acquiring method as described in embodiment 2 in a source eNB.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. An information acquiring method, comprising:
  receiving by a target base station from a source base station reception status information of a multimedia broadcast multicast service for a user equipment when the user equipment is handed over between cells;
  wherein the reception status information received from the source base station includes information reported from the user equipment to the source base station in advance of the handover between cells, the information reported from the user equipment indicating that the user equipment is receiving a multimedia broadcast multicast service and a carrier frequency carrying the multimedia broadcast multicast service which the user equipment is receiving.

2. The method according to claim 1, wherein the reception status information further comprises service information of the multimedia broadcast multicast services the service information comprising one or more pieces of the following information:
  multicast broadcast single frequency network area ID, multimedia broadcast multicast service ID, multimedia broadcast multicast service session ID, temporary mobile group identity.

3. The method according to claim 1, wherein the method further comprises returning by the target base station a reception confirm message to the source base station.

4. The method according to claim 2, wherein when the target base station is capable of providing the multimedia broadcast multicast service to the user equipment, the method further comprises: updating by the target base station the service information of the multimedia broadcast multicast service received by the user equipment.

5. The method according to claim 1, wherein when a target cell belongs to a reserved cell of a multicast broadcast single frequency network area or when a target cell does not belong to the multicast broadcast single frequency network area providing the multimedia broadcast multicast service or when a target cell has no adequate resources for providing the multimedia broadcast multicast service, the target base station is incapable of providing the multimedia broadcast multicast service to the user equipment, the method further comprises:
providing by the target base station the multimedia broadcast multicast service to the user equipment through a broadcast or a unicast mode.

6. The method according to claim 5, wherein the target base station provides the multimedia broadcast multicast service through a broadcast or a unicast mode when a target cell belongs to a reserved cell of a multicast broadcast single frequency network area;
when a target cell does not belong to the multicast broadcast single frequency network area providing the multimedia broadcast multicast service, the target cell joins in the multicast broadcast single frequency network area providing the multimedia broadcast multicast service, and the target base station provides the multimedia broadcast multicast service through broadcast;
when a target cell does not belong to the multicast broadcast single frequency network area providing the multimedia broadcast multicast service, the target base station provides the multimedia broadcast multicast service through a unicast mode; and
when a target cell has no adequate resources for providing the multimedia broadcast multicast service, the target base station provides the multimedia broadcast multicast service through a unicast mode.

7. An information acquiring method, comprising:
reporting by a source base station of user equipment to a target base station reception status information of a multimedia broadcast multicast service for the user equipment when the user equipment is handed over between cells; and
receiving by the source base station from the user equipment the reception status information in advance of the handover between cells, wherein the reception status information includes information indicating that the user equipment is receiving a multimedia broadcast multicast service and a carrier frequency carrying the multimedia broadcast multicast service which the user equipment is receiving.

8. The method according to claim 7, wherein the reception status information further comprises service information of the multimedia broadcast multicast service, the service information comprising one or more pieces of the following information:
multicast broadcast single frequency network area ID, multimedia broadcast multicast service ID, multimedia broadcast multicast service session ID, temporary mobile group identity.

9. The method according to claim 7, wherein the receiving by the source base station the reception status information comprises:
transmitting by the source base station to the user equipment a request message indicating that the user equipment reports the reception status information; and
receiving by the source base station the reception status information reported by the user equipment in response to the request message, so as to acquire the reception status information.

10. A target base station, comprising:
a transmitter; and
a receiver configured to receive from a source base station reception status information of a multimedia broadcast multicast service for a user equipment when the user equipment is handed over between cells;
wherein the reception status information received from the source base station includes information reported from the user equipment to the source base station in advance of the handover between cells, the information reported from the user equipment indicating that the user equipment is receiving a multimedia broadcast multicast service and a carrier frequency carrying the multimedia broadcast multicast service which the user equipment is receiving.

11. The target base station according to claim 10, wherein the transmitter is configured to return a reception confirm message to the source base station after receiving the reception status information.

12. The target base station according to claim 10, wherein the reception status information further comprises service information of the multimedia broadcast multicast services the service information comprising one or more pieces of the following information:
multicast broadcast single frequency network area ID, multimedia broadcast multicast service ID, multimedia broadcast multicast service session ID, temporary mobile group identity; and
the target base station further comprises a processor circuit configured to update the service information of the multimedia broadcast multicast service received by the user equipment when the target base station is capable of providing to the user equipment the multimedia broadcast multicast service.

13. The target base station according to claim 10, wherein when a target cell belongs to a reserved cell of a multicast broadcast single frequency network area or when a target cell does not belong to the multicast broadcast single frequency network area providing the multimedia broadcast multicast service or when a target cell has no adequate resources for providing the multimedia broadcast multicast service, the target base station is incapable of providing to the user equipment the multimedia broadcast multicast service; and
the target base station further comprises a transmitter configured to provide to the user equipment the multimedia broadcast multicast service through a broadcast or a unicast mode when the target base station is incapable of providing to the user equipment the multimedia broadcast multicast service.

14. A source base station, comprising:
transmitter configured to report to a target base station reception status information of a multimedia broadcast multicast service for a user equipment when the user equipment is handed over between cells; and
a receiver configured to receive the reception status information from the user equipment in advance of the handover between cells, wherein the reception status information includes information indicating that the user equipment is receiving a multimedia broadcast multicast service and a carrier frequency carrying the multimedia broadcast multicast service which the user equipment is receiving.

15. The source base station according to claim 14, wherein the:
transmitter is further configured to transmit a request message to the user equipment indicating that the user equipment reports the reception status information; and
the receiver is further configured to receive the reception status information reported by the user equipment in response to the request message transmitted so as to acquire the reception status information.

16. A communication system, comprising user equipment, wherein the communication system further comprises a source base station of the user equipment and a target base station;
the source base station configured to report to a target base station reception status information of a multimedia broadcast multicast service for the user equipment when the user equipment is handed over between cells; and
the target base station configured to receive the reception status information of a multimedia broadcast multicast service for the user equipment reported by the source base station;
wherein the reception status information which is reported from the user equipment to the source base station in advance of the handover between cells includes information indicating that the user equipment is receiving a multimedia broadcast multicast service and a carrier frequency carrying the multimedia broadcast multicast service which the user equipment is receiving.

17. The system according to claim 16, wherein the reception status information further comprises service information of the multimedia broadcast multicast services the service information comprising one or more pieces of the following information:
multicast broadcast single frequency network area ID, multimedia broadcast multicast service ID, multimedia broadcast multicast service session ID, temporary mobile group identity.

18. A communication method used in a user equipment, comprising:
reporting reception status information, including information indicating that the user equipment is receiving a multimedia broadcast multicast service and a carrier frequency carrying the multimedia broadcast multicast service which the user equipment is receiving, to a source base station in advance of the handover between cells, when the user equipment is handed over between cells; and
being provided with a corresponding multimedia broadcast multicast service by a target base station,
wherein the reception status information including the information reported to the source base station is reported from the source base station to the target base station.

19. A target base station, comprising:
a transmitter;
a receiver; and
a processor circuit coupled with the receiver configured to cause the receiver to receive from a source base station reception status information of a multimedia broadcast multicast service for a user equipment when the user equipment is handed over between cells;
wherein the reception status information received from the source base station includes information reported from the user equipment to the source base station in advance of the handover between cells, the information indicating that the user equipment is receiving a multimedia broadcast multicast service and a carrier frequency carrying the multimedia broadcast multicast service which the user equipment is receiving.

20. The target base station according to claim 19, wherein the processor circuit further configured to cause the transmitter to return a reception confirm message to the source base station after receiving the reception status information.

21. The target base station according to claim 20, wherein when a target cell belongs to a reserved cell of a multicast broadcast single frequency network area or when a target cell does not belong to the multicast broadcast single frequency network area providing the multimedia broadcast multicast service or when a target cell has no adequate resources for providing the multimedia broadcast multicast service, the target base station is incapable of providing to the user equipment the multimedia broadcast multicast service; and
the target base station further comprises a processor circuit coupled to the transmitter configured to provide to the user equipment the multimedia broadcast multicast service through a broadcast or a unicast mode when the target base station is incapable of providing to the user equipment the multimedia broadcast multicast service.

22. The target base station according to claim 19, wherein the reception status information further comprises service information of the multimedia broadcast multicast services the service information comprising one or more pieces of the following information:
multicast broadcast single frequency network area ID, multimedia broadcast multicast service ID, multimedia broadcast multicast service session ID, temporary mobile group identity; and
the processing circuit further configured to update the service information of the multimedia broadcast multicast service received by the user equipment when the target base station is capable of providing to the user equipment the multimedia broadcast multicast service.

23. A source base station, comprising:
a receiver;
a transmitter; and
a processor circuit configured to cause the transmitter report to a target base station reception status information of a multimedia broadcast multicast service for a user equipment when the user equipment is handed over between cells;
wherein the processor circuit is further configured to cause the receiver to receive the reception status information from the user equipment in advance of the handover between cells, the reception status information includes information indicating that the user equipment is receiving a multimedia broadcast multicast service and a carrier frequency carrying the multimedia broadcast multicast service which the user equipment is receiving.

24. The source base station according to claim 23, the receiver is further configured to acquire the reception status information.

25. The source base station according to claim 23, wherein the transmitter is further configured to transmit a request message to the user equipment indicating that the user equipment reports the reception status information, and the receiver is further configured to receive the reception status information reported by the user equipment in response to the request message transmitted by the transmitter, so as to acquire the reception status information.

\* \* \* \* \*